United States Patent
Barton

(10) Patent No.: US 10,334,069 B2
(45) Date of Patent: Jun. 25, 2019

(54) MANAGING A LOCAL CACHE FOR AN ONLINE CONTENT-MANAGEMENT SYSTEM

(71) Applicant: Dropbox, Inc., San Francisco, CA (US)

(72) Inventor: Chris Barton, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 729 days.

(21) Appl. No.: 13/891,795

(22) Filed: May 10, 2013

(65) Prior Publication Data

US 2014/0337458 A1 Nov. 13, 2014

(51) Int. Cl.
*H04L 29/08* (2006.01)

(52) U.S. Cl.
CPC .......... *H04L 67/2847* (2013.01); *H04L 67/22* (2013.01); *H04L 67/289* (2013.01); *H04L 67/306* (2013.01)

(58) Field of Classification Search
CPC . H04L 67/2842; H04L 67/2847; H04L 67/22; H04L 67/306; H04L 67/289
See application file for complete search history.

(56) References Cited

U.S. PATENT DOCUMENTS

| | | | |
|---|---|---|---|
| 2003/0145038 A1* | 7/2003 | Bin Tariq | H04L 65/4084 709/202 |
| 2006/0233537 A1* | 10/2006 | Larsen et al. | 386/131 |
| 2006/0235605 A1* | 10/2006 | Flynt | 701/200 |
| 2011/0317675 A1* | 12/2011 | Cho | H04L 67/22 370/338 |
| 2012/0096051 A1* | 4/2012 | Davis | H04L 41/0806 707/805 |
| 2012/0191834 A1 | 7/2012 | Song | |
| 2012/0254894 A1* | 10/2012 | Fukuda | G06F 9/445 719/318 |
| 2012/0331050 A1* | 12/2012 | Wilbur et al. | 709/204 |
| 2012/0331521 A1* | 12/2012 | Ansari | 726/3 |
| 2014/0082178 A1* | 3/2014 | Boldyrev | H04L 67/10 709/224 |

OTHER PUBLICATIONS

Tingxin Yan et al.: Fast App Launching for Mobile Devices Using Predictive User Context, MobiSys '12, Jun. 25-29, 2012, Low Wood Bay, Lake District, UK, ACM 978-1-4503-13-1, Aug. 12, 2006.

(Continued)

*Primary Examiner* — Clayton R Williams
*Assistant Examiner* — Tania M Pena-Santana
(74) *Attorney, Agent, or Firm* — Polsinelli PC

(57) ABSTRACT

The disclosed embodiments relate to techniques for managing a local cache on a computing device that stores content items for an online content-management system. These techniques generally operate by gathering information that is available on the computing device (such as information about user actions, information about which applications are executing, and information about the location of the computing device) and using this information to identify relevant content items that are likely to be accessed in the near future. This enables the system to perform cache-management operations at the local cache to facilitate rapidly accessing the relevant content items through the local cache.

18 Claims, 6 Drawing Sheets

(56) References Cited

OTHER PUBLICATIONS

Lakshmish Ramaswamy et al.: Cache Clouds: Cooperative Caching of Dynamic Documents in Edge Networks, Proceedings of the 25th IEEE International Conference on Distributed Computing Systems, 1063-6927/05, 2005.
Lakshmish Ramaswamy et al.: Scalable Delivery of Dynamic Content Using a Cooperative Edge Cache Grid, IEEE Computer Society, 1041-4347/07, 2007 IEEE.

* cited by examiner

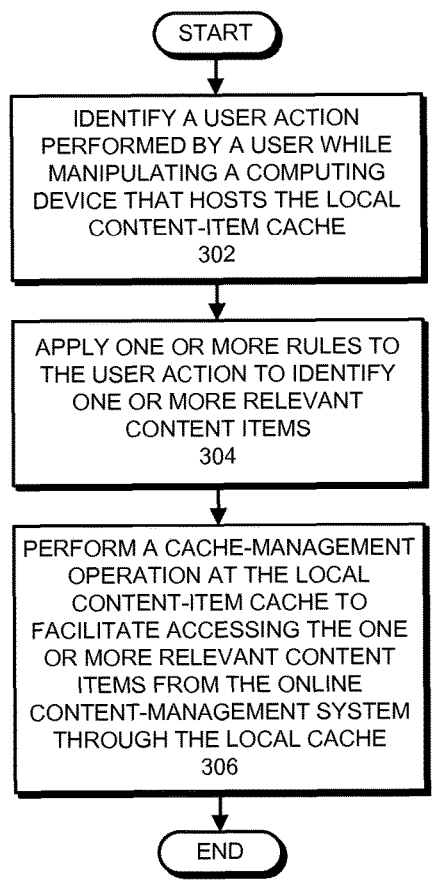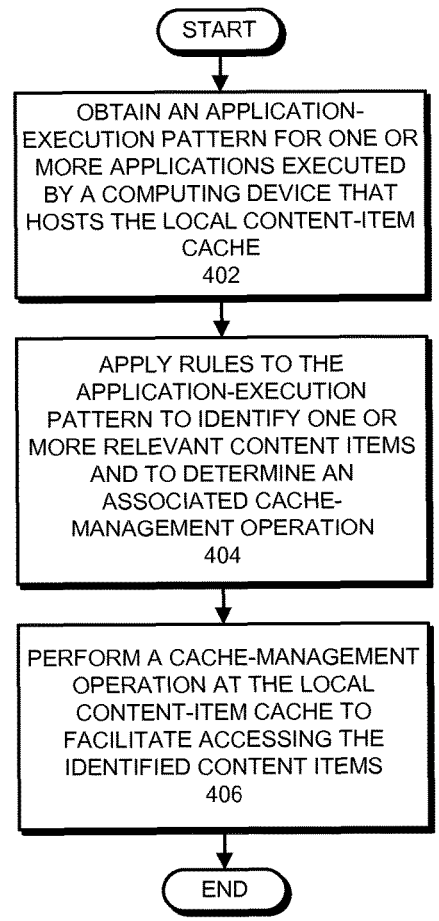
FIG. 3
FIG. 4

MANAGING A LOCAL CACHE FOR AN ONLINE CONTENT-MANAGEMENT SYSTEM

BACKGROUND

Field

The disclosed embodiments generally relate to techniques for accessing an online content-management system. More specifically, the disclosed embodiments relate to a technique for managing a local cache on a computing device for an online content-management system.

Related Art

Online content-management systems such as the Dropbox™ service that is offered by Dropbox, Inc., of San Francisco, Calif., are quite useful because they enable users to access their online content from a number of different computing devices, including mobile devices. Unfortunately, network connections from mobile devices are often slow and unreliable. This makes it challenging for an online content-management system to provide reasonable performance while retrieving large content items, such as photographs and video clips, from a mobile device.

This performance problem can be addressed by storing commonly accessed content items in a local cache on the mobile device, which greatly improves access speed and also makes it possible to work offline when a network connection is unavailable. However, there are resource limitations on a mobile device, such as a smartphone, which makes it hard to cache more than a small number of content items on a mobile device. Hence, the key to achieving adequate access performance while retrieving content items from a mobile device is to accurately determine what content items will be most relevant to the user in the near future, so that these relevant content items can be prefetched and stored in the local cache on the mobile device.

SUMMARY

The disclosed embodiments relate to techniques for managing a local cache on a computing device that stores content items for an online content-management system. These techniques generally operate by gathering information that is available on the computing device (such as information about user actions, information about which applications are executing, and information about the location of the computing device) and using this information to identify relevant content items that are likely to be accessed in the near future. This enables the system to perform cache-management operations at the local content-item cache to rapidly access the relevant content items through the local content-item cache.

For example, suppose a user tends to access a photo-editing application more than a car-navigation application. Then, more space can be reserved in the local content-item cache for content items associated with the photo-editing application (e.g., photographs) and less space can be reserved in the local content-item cache for the content items for the car-navigation application (e.g., map data).

In another example, suppose the system observes that the user tends to access photographs through the mobile device while at home, and tends to access documents through the mobile device while at work. Then, most of the space in the local content-item cache can be reserved for photographs when the mobile device is located at the user's home, and most of the space in the local content-item cache can be reserved for documents when the mobile device is located at the user's workplace.

BRIEF DESCRIPTION OF THE FIGURES

FIG. 3 presents a flow chart illustrating the process of making cache-management decisions based on user actions in accordance with the disclosed embodiments.

FIG. 4 presents a flow chart illustrating the process of making cache-management decisions based on application-execution patterns in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

As mentioned above, the disclosed embodiments relate to caching techniques for an online content-management system that operates by gathering information that is available on the computing device (such as information about user actions, which applications are executing and the location of the computing device) and using this information to identify relevant content items that are likely to be accessed in the near future. Before we describe details of these caching techniques, we first describe the structure of an online content-management system 120 that operates within a content-management environment 105.

Content-Management Environment

Figure 1:
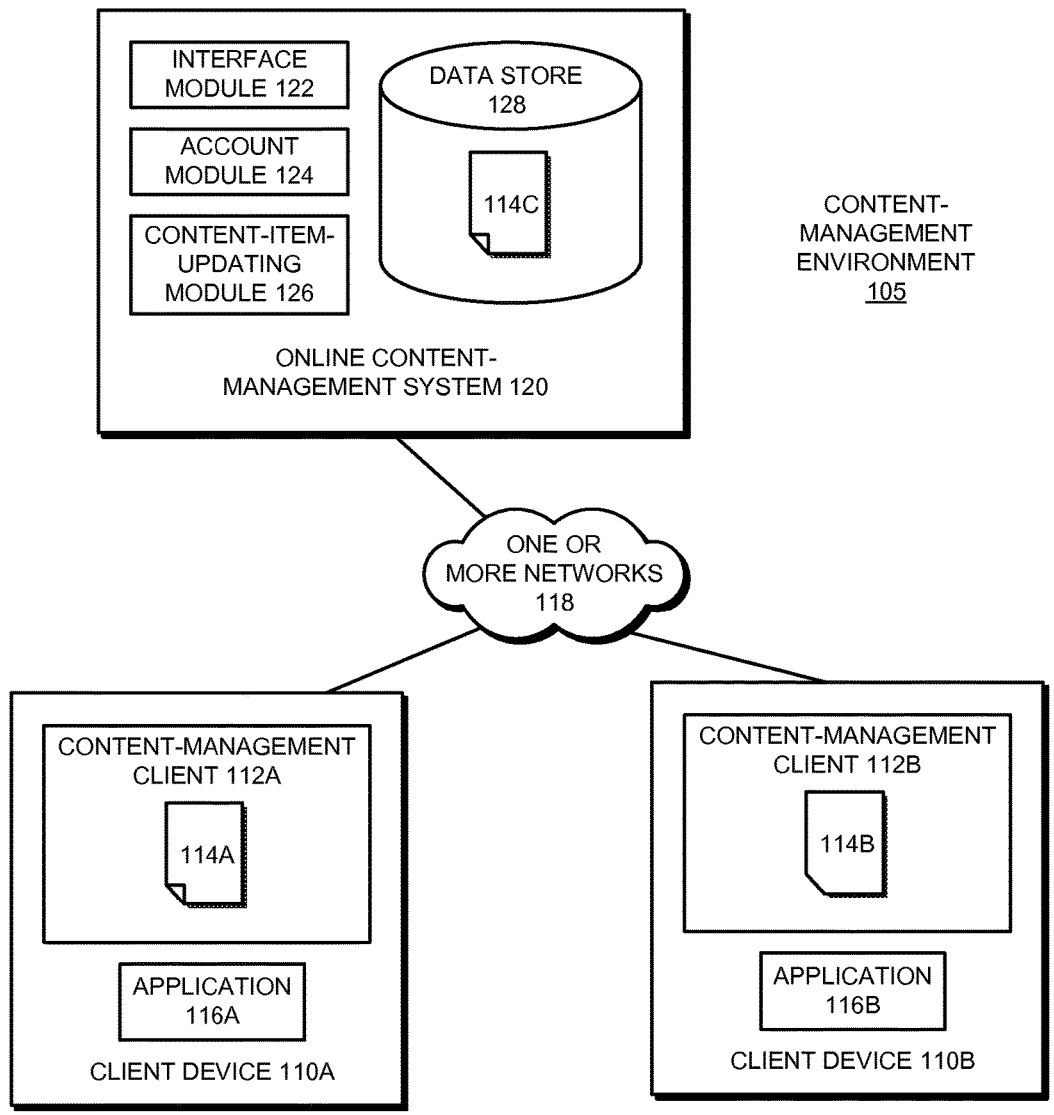
FIG. 1 illustrates a content-management environment in accordance with the disclosed embodiments.

FIG. 1 illustrates content-management environment 105 according to various embodiments. As may be understood from this figure, content-management environment 105 includes a plurality of client devices 110A and 110B (collectively 110) and an online content-management system 120 (also referred to as a "content-management system"), which are interconnected by one or more networks 118. Various aspects of the client devices 110 and online content-management system 120 are discussed below.

Client Devices

In various embodiments, each client device 110 may selectively execute a content-management client application 112A and 112B (collectively 112) (also referred to as a "content-management client") that may be used to access content items stored within online content-management system 120. In some embodiments, synchronized copies of a content item 114A, 114B and 114C are maintained on client devices 110A and 110B and within online content-management system 120, respectively. (Note that a "content item" can include a file, a folder, a set of folders, or any other type of data object.) In some embodiments, client devices 110 may provide a file-browser type interface (not shown) for directly manipulating the content items stored on online content-management system 120 without maintaining a local copy. Client devices 110 may also include applications 116A and 116B (collectively 116) that manipulate copies of content items 114A and 114B.

While only two client devices 110A and 110B are shown in FIG. 1 for purposes of clarity, it should be understood by those skilled in the art that many client devices 110 may simultaneously connect through network(s) 118 to online content-management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synced copy of one or more content items from within online content-management system 120, and the content items may be stored in any suitable format. When content-management client 112 presents content items that are stored within the online content-management system 120 to a user, the content items may be arranged in folders and the folders themselves may be arranged in other folders, or in any other arbitrary arrangement supported by online content-management system 120, as determined by the user. However, one of skill in the art should understand in light of this disclosure that each user's content item storage architecture may be considerably different from the next, and in some instances, the content item storage architecture may be implemented to maximize storage and content item retrieval efficiency.

Content-Management System

Online content-management system 120 stores content items and manages access to those content items via client devices 110. Online content-management system 120 and its components may be implemented using any appropriate hardware and software that supports file serving, storage, and retrieval functions. For example, online content-management system 120 may be implemented in a single server or multiple servers.

In various embodiments, online content-management system 120 includes interface module 122, account module 124, content-item-updating module 126, and data store 128. Some of the elements of online content-management system 120 are discussed below.

Content-Management System—Interface Module

In particular embodiments, interface module 122 may facilitate content item access and content item storage operations among content-management system 120 and client devices 110. Interface module 122 may receive content items from and send content items to client devices 110 consistent with the user's preferences for sharing content items. Interface module 122 may also act as the counterpart to a client-side file-explorer style user interface that allows a user to manipulate content items directly stored on content-management system 120. In some embodiments, software on client devices 110 may integrate network-stored content items with the client's local file system to enable a user to manipulate network-stored content items through the same user interface (UI) used to manipulate content items on the local file system, e.g., via a file explorer, file finder or browser application. As an alternative or supplement to the client-side file-explorer interface, interface module 122 may provide a web interface for client devices 110 to access (e.g., via an application 116) and allow a user to manipulate content items stored within content-management system 120. In this way, the user can directly manipulate content items stored within content-management system 120.

Content-Management System—Data Store

In various embodiments, data store 128 may store content items such as those uploaded using client devices 110, or using any other suitable computing device. In the embodiment illustrated in FIG. 1, client device 110A, which is associated with a first user, is shown as locally storing at least one content item 114A, and client device 110B, which is associated with a second user, is shown as locally storing at least one content item 114B. As shown in FIG. 1, a copy of the locally stored content item 114C is maintained in data store 128 of content-management system 120. In the embodiment illustrated in FIG. 1, content items 114A, 114B and 114C are local versions of the same shared document that resides on client devices 110A, 110B and online content-management system 120, respectively. Note that client devices 110A and 110B may also store other content items that are replicated on online content-management system 120, but are not shared with other client devices.

In various embodiments, data store 128 may maintain information identifying the user, information describing the user's file directory, and other information in a file journal that is maintained for each user. In some embodiments, the file journal may be maintained on content-management system 120, and in other embodiments, a file journal (e.g., a "server-side file journal") may be maintained on both content-management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within content-management system 120 and the copy of the content item 114B on client device 110B. Similarly, any changes that are made to content item 114C on content-management system 120 may also be automatically reflected in the copy of content item 114A stored on client device 110A, and the copy of content item 114B stored on client device 110B.

Also, content items 114A and 114B may be stored in local caches within content-management clients 112A and 112B, respectively. Alternatively, content items 114A and 114B may be stored in local file systems within content-management clients 112A and 112B. In some situations, content items 114A and 114B are stored in file system space that is reserved for content-management clients 112A and 112B. In other situations, content items 114A and 114B are stored in normal file system space that is not reserved for content-management clients 112A and 112B.

Content-Management System—Account Module

In particular embodiments, account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all their content items among their desktop computer, tablet computer, and mobile device. To make such a sharing arrangement seamless to the user, the user's single account on content-management system 120 may be associated with each of the user's respective client devices. In some embodiments, an application running on each respective client device 110 may help to coordinate synchronization of content items on the client device with corresponding versions of the content items within the user's account in content-management system 120, and also with corresponding versions of the content items stored on the user's various other client devices.

Content-Management System—Content-Item-Updating Module

In particular embodiments, content-item-updating module 126 is configured to maintain consistency among different copies (versions) of a content item 114A, 114B and 114C that are located in client device 110A, client device 110B and online content-management system 120, respectively. This can be complicated, because the different versions 114A, 114B and 114C of the same shared content items may be simultaneously changed at client devices 110A-B and online content-management system 120. Hence, online content-management system 120 needs to enforce an updating policy to resolve conflicting updates to different versions of the same content item. For example, the copy of the content item 114C on online content-management system 120 can be the master copy of the content item, and updates to the various copies 114A, 114B and 114C of the content items can be serialized and applied one-at-a-time to the master copy 114C before being propagated back to the copies 114A and 114B located on client devices 110A and 110B.

Caching Structure

Figure 2:
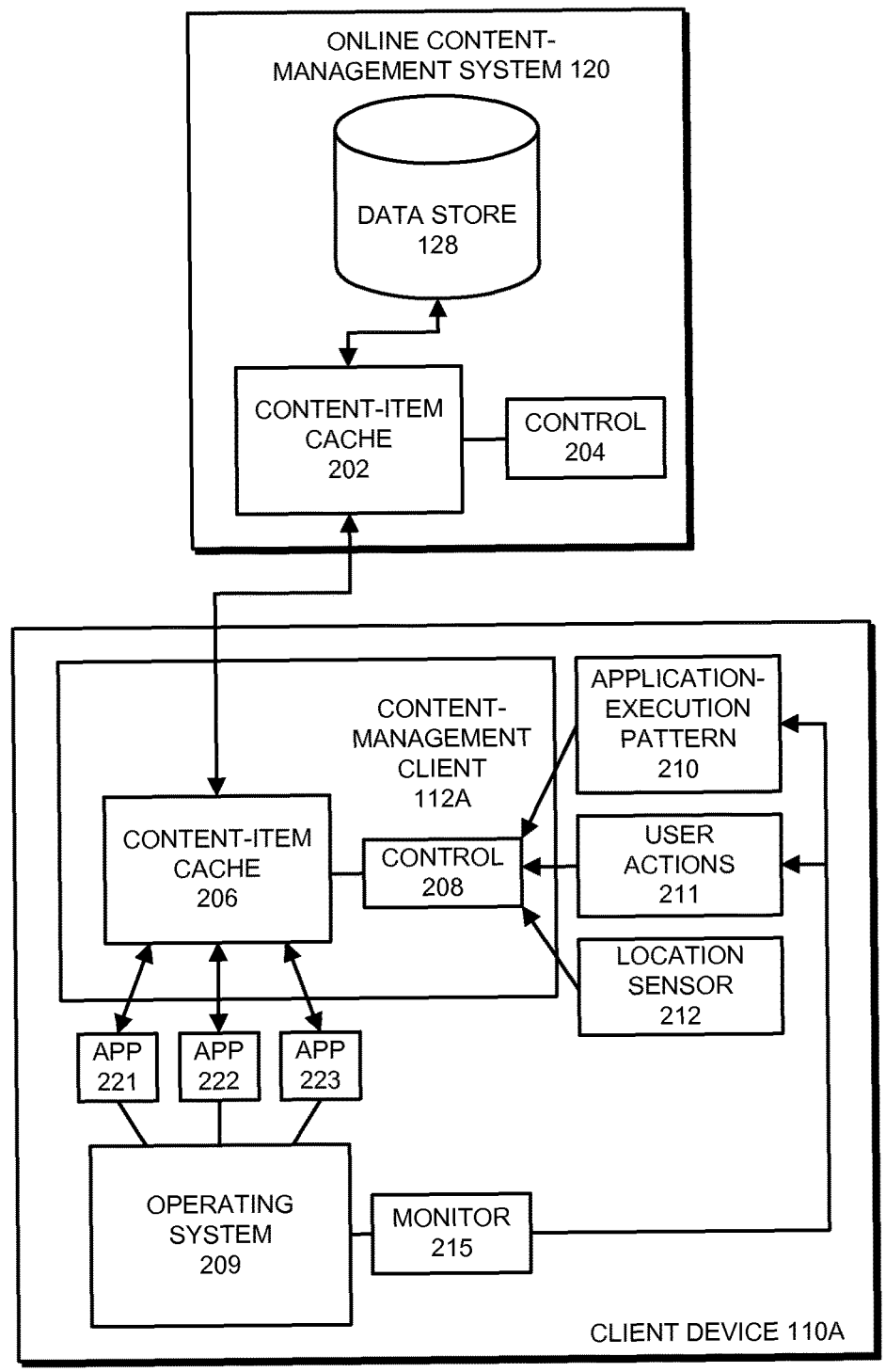
FIG. 2 illustrates a caching structure in an exemplary online content-management system in accordance with the disclosed embodiments.

FIG. 2 illustrates the caching structure in online content-management system 120 in accordance with the disclosed embodiments. Note that if a client device 110A is a mobile device, such as a smartphone or a tablet computer, client device 110A may possess only a small amount of storage capacity to store local copies of content items from online content-management system 120. As mentioned above, this can create performance problems while accessing content items because network connections from mobile devices are often slow and unreliable. These performance problems can be alleviated by performing cache-management operations, such as prefetches, to cache "relevant" content items that are likely to be accessed in the near future.

These caching operations can be supported by a content-item cache 206 that is located within content-management client 112A, wherein content-item cache 206 is configured to store copies of content items or portions of content items from online content-management system 120. Note that content-item cache 206 may be located in a memory space or a file system space that is specifically allocated for content-management client 112A. Alternatively, content-item cache 206 can be located in a general memory space or a file system that is not specifically allocated for content-management client 112A.

Moreover, content-item cache 206 can possibly be expanded as necessary to accommodate additional content items to accommodate changing system requirements. However, if content-item cache 206 changes in size, the lookup structure for content-item cache 206 must similarly be expanded. For example, if the lookup structure in content-item cache 206 is a hash table, the hash table may need to be increased in size.

Also note that content-item cache 206 is implemented on top of the lower-level processor caches that contain instructions and data for processor cores within client device 110A. Hence, a content item is typically first pulled into content-item cache 206 and then a portion of the content item is pulled into a processor data cache (not shown) so that a corresponding processor core can access the portion of the content item.

In some embodiments, content-item cache 206 is implemented in software, much like a file-system cache for an operating system. In this case, lookups within content-item cache 206 can be based on a corresponding file name or a content-item identifier. Content-item cache 206 can also be implemented in hardware, like a processor cache inside a processor chip. In this case, content items are mapped into a physical or virtual address space, and cache lookups are based on a corresponding physical or virtual address.

Content-item cache 206 operates under control of a cache controller 208 (abbreviated in FIG. 2 as "CONTROL"), which can be any type of hardware or software structure that performs cache-management operations, such as lookup operations, prefetching operations, eviction operations and replacement operations. To improve performance it is desirable for cache controller 208 to determine which content items are most "relevant" and hence most likely to be accessed in the near future. This enables cache controller 208 to perform cache-management operations to ensure that the relevant items are located within content-item cache 206 when they are needed. These cache-management operations can involve prefetching relevant content items from online content-management system 120 into content-item cache 206. It can also involve ensuring that cache-replacement operations do not remove relevant content items from content-item cache 206.

For example, cache controller 208 can use a variation of a least-recently-used (LRU) cache-replacement policy that takes into account information that is available within client device 110A when deciding which cache lines to evict. For example, cache controller 208 can determine that client device 110A is in motion, which means that a user of client device 110A is likely travelling. Cache controller 208 can use this information to decide not to evict content items containing mapping data for a car-navigation application during an LRU cache-replacement operation, even if this mapping data has not been accessed recently. Cache controller 208 can also use other cache-replacement policies besides LRU, such as most-frequently used, pseudo-LRU, random replacement, most-recently used and least-frequently used.

To further improve access performance, online content-management system 120 can implement a secondary content-item cache 202 (and an associated cache controller 204) that is larger than the content-item cache 206. The larger size of secondary content-item cache 202 enables secondary content-item cache 202 to store more content items than can be stored in local content-item cache 206. Because of networking delays, the access time to the secondary content-item cache 202 will be longer than the access time to the local content-item cache 206. However, the access times for content items stored in secondary content-item cache 202 will typically be shorter than the access times for content items stored in data store 128. (Note that the secondary content-item cache 202 can be located in random-access memory instead of solid-state storage or disk storage, which makes it faster to retrieve a content item from the secondary content-item cache 202 than it is to retrieve a content item from data store 128.)

When an application on client device 110A accesses a content item, such as a photo, through content-management client 112A, content-management client 112A first attempts to access the content item from content-item cache 206. If the content item is not present in content-item cache 206, content-management client 112A makes a call to online content-management system 120, which first attempts to access the content item from secondary content-item cache 202. If the content item is not present in secondary content-item cache 202, online content-management system 120 accesses the content item from data store 128.

Note that secondary content-item cache 202 can be a dedicated cache containing only content items that are accessed through content-management client 112A. Alternatively, secondary content-item cache 202 can be a shared cache that is shared between multiple content-management clients, including content-management client 112A.

As illustrated in FIG. 2, cache controller 208 receives information from a number of sources within client device 110A. This information is used by cache controller 208 to make cache-management decisions as is described in more detail below. More specifically, cache controller 208 can receive location information from a location sensor 212 within client device 110A. Location sensor 212 can generally include any system or mechanism for determining the location of client device 110A. For example, location sensor 212 can be a Global Positioning System (GPS) transceiver that obtains location information from the GPS satellite network. In another example, location sensor 212 can include a cell phone transceiver that uses information obtained from communicating with cell towers to triangulate a location for client device 110A. In yet another example, location sensor 212 can be a Wi-Fi transceiver that communicates with a nearby Wi-Fi base station, and the Wi-Fi base station reports its location to the Wi-Fi transceiver. Note that this Wi-Fi base station location can be used as an approximation for the location of client device 110A.

This location information can be used to make decisions about what types of content item are most likely to be accessed. For example, if the location information indicates that a user of client device 110A is at home, cache controller 208 can prefetch photographs that the user tends to view at home. In another example, if the location information indicates that the user is driving or riding in a car, cache controller 208 can start prefetching content items containing data for a car-navigation application.

Cache controller 208 also receives application-execution patterns 210 from a monitor 215 associated with operating system 209. While the operating system 209 executes applications 221-223 that access content-item cache 206, monitor 215 records the sequence of applications that are executed by one or more processor cores within client device 110A. The application-execution pattern can be obtained by examining the run queue of a processor core within client device 110A to determine which processes are running, and then examining the process-state information to determine which applications are being executed by the processes. These application-execution patterns 210 are reported to cache controller 208 to help cache controller 208 determine which content items to prefetch and maintain in content-item cache 206.

For example, if application-execution patterns 210 indicate that client device 110A regularly returns to executing a car-navigation application, even if other applications such as a web browser are used periodically, cache controller 208 ensures that a portion of content-item cache 206 is always reserved for mapping data for the car-navigation application. In this way, when execution of the car-navigation application resumes, content-item cache 206 will always contain mapping data, which reduces delays associated with loading mapping data from online content-management system 120.

Cache controller 208 can also receive indicators of user actions 211 from monitor 215, which can examine operating system state information to determine various actions that a user performs. For example, monitor 215 might examine information for an accelerometer within client device 110A to determine that a user of client device 110A is running. In response, cache controller 208 can begin prefetching content items containing the user's favorite running music. In another example, monitor 215 can determine that the user of client device 110A is making a telephone call by examining cell phone activation information within operating system 209. In response, cache controller 208 can temporarily move content-item cache 206 into a power-saving mode because the user is not likely to access content items while speaking on the phone. In yet another example, monitor 215 can determine that the user has placed client device 110A into a docking station at the user's place of work. In response, cache controller 208 can begin prefetching content items containing documents that the user was previously editing at work. In another example, monitor 215 can examine information for a microphone on client device 110A to determine that the user of client device 110A is in a very noisy environment such as a nightclub or a concert. In response, cache controller 208 can begin evicting content items containing the music files because the user is not likely to be playing music in such a noisy environment. (Note that the application-execution patterns are an indicator of which applications the user chooses to execute and can be considered an indicator of user actions. Similarly, location information is technically an indicator of where the user is travelling while in possession of client device 110A.)

Cache-Management Decisions Based on User Actions

FIG. 3 presents a flow chart illustrating the process of making cache-management decisions based on user actions in accordance with the disclosed embodiments. The system first identifies a user action that is performed by the user while manipulating a computing device (e.g., client device 110A) that hosts the local content-item cache 206 (step 302). Next, the system applies one or more rules to the user action rules to identify one or more relevant content items (step 304). (Note that these rules can be pre-specified by the user, a system designer or an application designer and can be stored ahead of time in a rule database.) Finally, the system performs a cache-management operation at local content-item cache 206 to facilitate accessing the one or more relevant content items through local content-item cache 206 (step 306). As mentioned previously, these cache-management operations can involve: (1) prefetching content items or portions of content items into content-item cache 206; (2) evicting content items or portions of content items from content-item cache 206; (3) preventing content items from being evicted from content-item cache 206; (4) moving content-item cache 206 into a low-power state; (5) increasing the size of content-item cache 206; and (5) decreasing the size of content-item cache 206.

Suppose the system determines that a user is beginning to compose a text message to a friend. The system can begin to prefetch content items into content-item cache 206 that are tagged with the friend's name. For example, the system can begin to prefetch photographs and documents that are tagged with the friend's name so that the content items will be available if the user decides to attach the content item to the text message that the user is composing. In another example, if a user has a photo of a friend or a document belonging to a friend, it is likely that the user will attach this photo or document to a text message that is being sent to the friend. Hence, it is useful to prefetch photographs and documents that are tagged with the friend's name.

In another example, the user action can include specifying a preference for certain types of content items in content-item cache 206. For example, if the user is a limousine driver, the user may specify that she wants to reserve a certain amount of space in content-item cache 206 for content items containing mapping data for a navigation application. In this case, the system will ensure that the specified amount of space is always reserved for such content items.

It is also possible for such user preferences to be modified. For example, if the system observes that no photographs are being accessed from content-item cache 206 and the user has reserved half of content-item cache 206 to hold photographs, the system can suggest to the user that the user preference for reserving half of content-item cache 206 for photographs be changed.

In another example, the user can also specify that content items associated with Internet browsing cannot displace content items containing business documents from content-item cache 206 because the business documents are more important than the Internet browsing.

The system can also implement caching strategies for specific users. For example, the system can observe that a specific user tends to access a social-networking site frequently. In response to this observation, the system can begin prefetching content items related to the social-networking site whenever the specific user logs on to client device 110A.

Cache-Management Decisions Based on Application-Execution Patterns

FIG. 4 presents a flow chart illustrating the process of making cache-management decisions based on application-execution patterns in accordance with the disclosed embodiments. First, the system obtains an application-execution pattern for one or more applications executed by a computing device that hosts the local content-item cache 206 (step 402). Next, the system applies one or more rules to the application-execution pattern to identify one or more relevant content items (step 404). As mentioned above, these rules can be pre-specified by the user, a system designer or an application designer and can be stored ahead of time in a rule database. Finally, the system performs the cache-management operation on local content-item cache 206 to facilitate accessing the identified content items through local content-item cache 206 (step 406).

In a simple but extremely useful case, if the system detects that an application is starting, the system can begin to prefetch content items that are associated with the application into content-item cache 206. For example, if the system determines from the application-execution pattern that a photo-editing application has been launched, the system can begin prefetching a set of photos that was most recently accessed through the photo-editing application. In another example, if the system determines from the application-execution pattern that a music-playing application has been has been launched, the system can begin prefetching a set of songs that was most recently played through the music-playing application. The system can also increase the size of content-item cache 206 to accommodate music files that tend to be quite large in size. In yet another example, if the system determines from the application-execution pattern that a document-editing application has been has been launched, the system can begin prefetching a set of documents that was most recently edited through the document-editing application. In the same example, if a music-playing application was previously executing, the system can decrease the size of content-item cache 206 because the prefetched documents are likely to consume less space than music files.

In another example, when the system detects that an application is starting, the system can begin to prefetch content items that are associated with a "related application" into content-item cache 206. For example, if the system determines from the application-execution pattern that the user is accessing a navigation application, the system can conclude that the user will be driving soon and is therefore more likely to access a music-playing application in the near future. In this example, the system can begin prefetching songs that were most recently played through the music-playing application. Or, if the application-execution pattern indicates that the user is accessing a social-networking application, the system can conclude that it is highly likely that the user will be uploading photos to the social-networking application. In this example, the system can begin prefetching photos were most recently accessed through the photo-editing application. In yet another example, if the application-execution pattern indicates that the user is playing a video game, the system can conclude that the user is no longer at work, so the user will be highly unlikely to access work-related documents in the near future. In this example, the system can begin evicting content items associated with work-related documents from the cache to make room for other more relevant content items. In another example, if the user is accessing a restaurant-reservation application to make a reservation at a particular restaurant, the system can determine that the user might be accessing a navigation application soon to determine the best route to the particular restaurant. In this example, the system can begin prefetching content items containing mapping data for the particular restaurant.

Cache-Management Decisions Based on Computing Device Location

Figure 5:
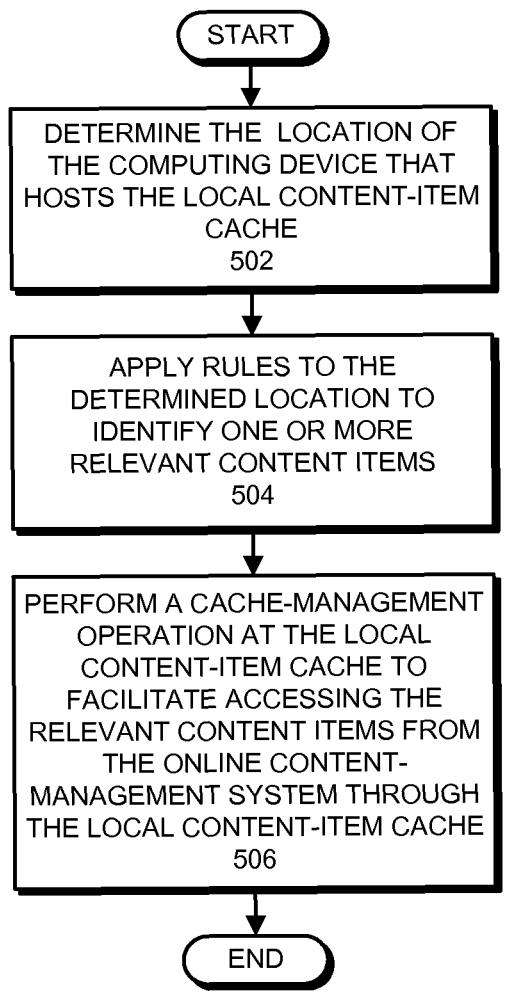
FIG. 5 presents a flow chart illustrating the process of making cache-management decisions based on the location of the computing device in accordance with the disclosed embodiments.

FIG. 5 presents a flow chart illustrating the process of making cache-management decisions based on the location of the computing device in accordance with the disclosed embodiments. First, the system determines the location of a computing device (e.g., client device 110A) that hosts the local content-item cache 206 (step 502). Next, the system applies one or more rules to the determined location to identify one or more relevant content items (step 504). As mentioned above, these rules can be pre-specified by the user, a system designer or an application designer and can be stored ahead of time in a rule database. Finally, the system performs a cache-management operation at the local content-item cache 206 to facilitate accessing the one or more relevant content items from online content-management system 120 through the local content-item cache 206 (step 506).

For example, if the location information indicates that a user of client device 110A is at work, cache controller 208 might begin prefetching the documents that the user was last editing at work.

Cache Clusters

In some situations it may be advantageous for a set of proximate computing devices to share their content-item caches to improve cache performance. This is especially true in situations where networking connectivity to the online content-management system 120 is spotty and the computing devices can communicate with each other through Wi-Fi or Bluetooth™ networks. For example, if passengers in a vehicle, such as a car or a train, have computing devices that can communicate with each other through Wi-Fi or Bluetooth™, and a cellular data connection to the online content-management system 120 is intermittent because the vehicle is travelling through dead cell zones, then the computing devices can work together to share content item cache resources.

Figure 6:
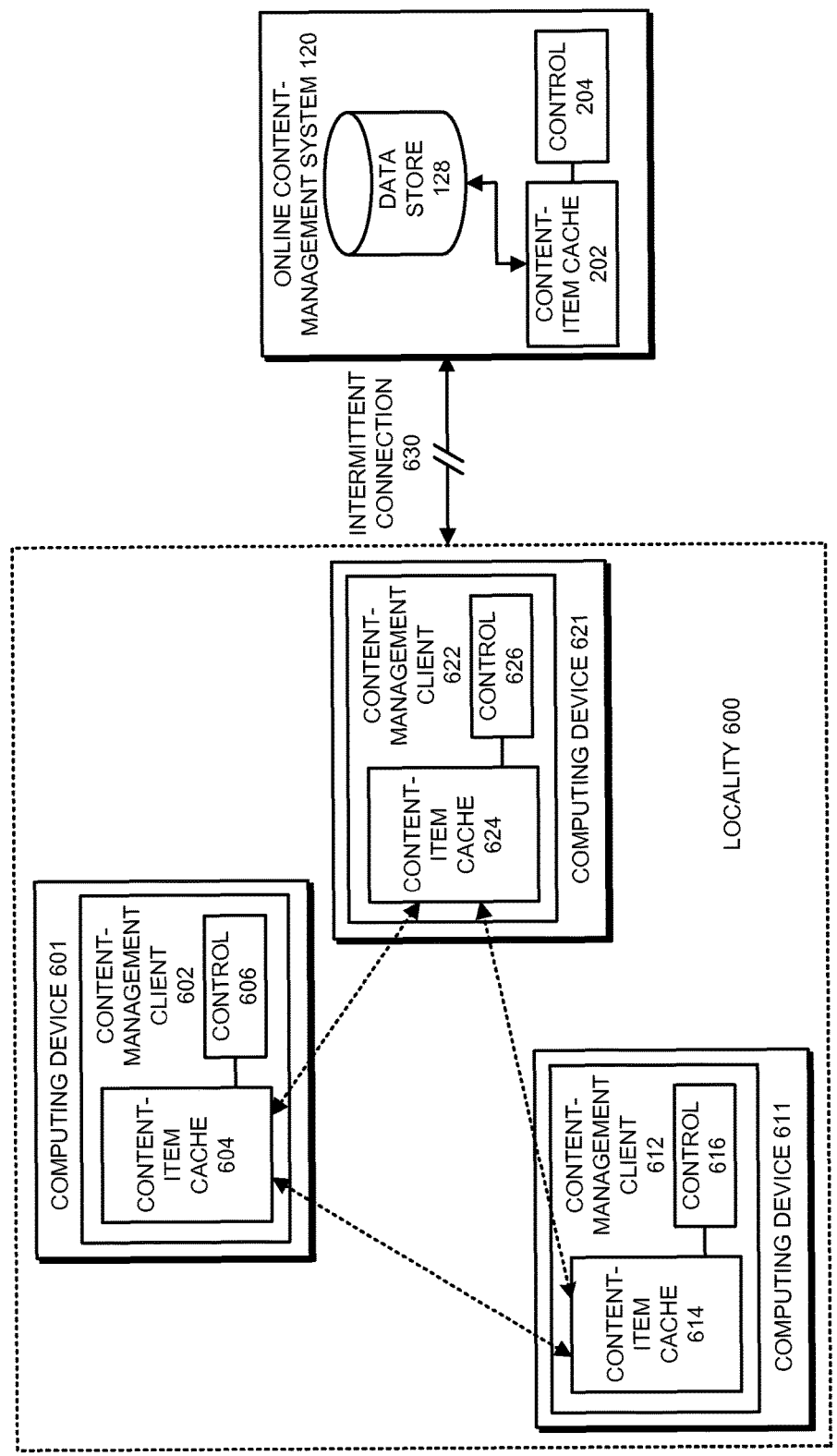
FIG. 6 illustrates how a collection of local caches for proximate computing devices can work together to improve cache performance in accordance with the disclosed embodiments.

FIG. 6 illustrates how a collection of local content-item caches 604, 614 and 624 for a set of computing devices 601, 611 and 621 in a locality 600 can work together to improve cache-access performance in accordance with the disclosed embodiments. Locality 600 can generally include any local environment wherein computing devices 601, 611 and 621 can reliably communicate with each other. For example, locality 600 can comprise a vehicle, such as an automobile, a bus, a train, a ship or an airplane. Alternatively, locality 600 can comprise a building, or a collection of proximate buildings, or even a small town. Note that locality 600 may not actually be a physical locality, and may for example comprise geographically distributed computing devices that can communicate through a corporate network, wherein the corporate network is faster and/or more reliable than a network connection 630 to an external online content-management system 120.

Computing devices 601, 611 and 621 within locality 600 can communicate with each other through any type of wired or wireless network, such as a Wi-Fi network, a Bluetooth™ network, a local area network, a cellular network or a near-field communications network. Computing devices 601, 611 and 621 communicate with online content-management system 120 through a slow or intermittent connection 630. This intermittent connection 630 can make it hard for content-management clients 602, 612 and 622 to access content items from online content-management system 120.

Hence, it is advantageous for content-management clients 602, 612 and 622 to work together to cache content items in their respective content-item caches 604, 614 and 624. For example, if one content-management client 602 is accessing a large number of content items and the other content-management clients 612 and 622 are idle, it is advantageous for content-management client 602 to use the capacity of content-item caches 614 and 624 to store content items.

Figure 7:
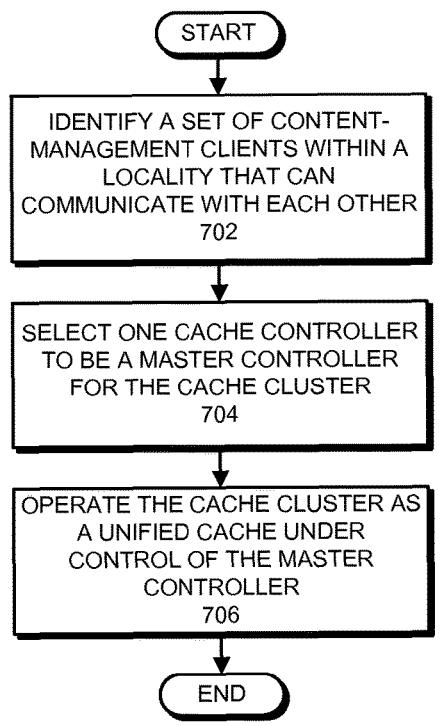
FIG. 7 presents a flow chart illustrating the process of forming a cache cluster in accordance with the disclosed embodiments.

In order to coordinate the actions of the various content-management clients in locality 600, it is advantageous for the content-management clients 602, 612 and 622 to be able to organize each other by appointing one cache controller to act as a master controller so that the respective caches can collectively act as a "cache cluster." For example, FIG. 7 presents a flow chart illustrating the process of forming a "cache cluster" in accordance with the disclosed embodiments. First, the system identifies a set of content-management clients 602, 612 and 622 within a locality that can communicate with each other (step 702). For example, this can involve each of the computing devices 601, 611 and 621 performing a discovery operation, such as a Wi-Fi or Bluetooth™ discovery operation, to identify a set of proximate computing devices that host content-management clients.

Next, the system forms the identified set of content-item caches into a cache cluster. Note that a number of techniques exist in the distributed computing literature that can be used to accomplish this task. One technique involves selecting one cache controller in the set of proximate cache controllers 606, 616 and 626 to be the master controller (step 704). For example, computing devices typically have serial numbers; the cache controllers 606, 616 and 626 can communicate these serial numbers with each other, and the cache controller with the lowest serial number can be appointed as the master controller. Next, the cache cluster is operated as a unified cache under control of the master controller (step 706). For example, suppose cache controller 606 is selected to be the master controller. In this case, cache controller 606 can be responsible for performing all of the cache-management operations for all of the content-item caches 604, 614 and 624 in the cluster. This means that the other cache controllers 616 and 626 relay input signals to (and receive commands from) cache controller 606.

Figure 8:
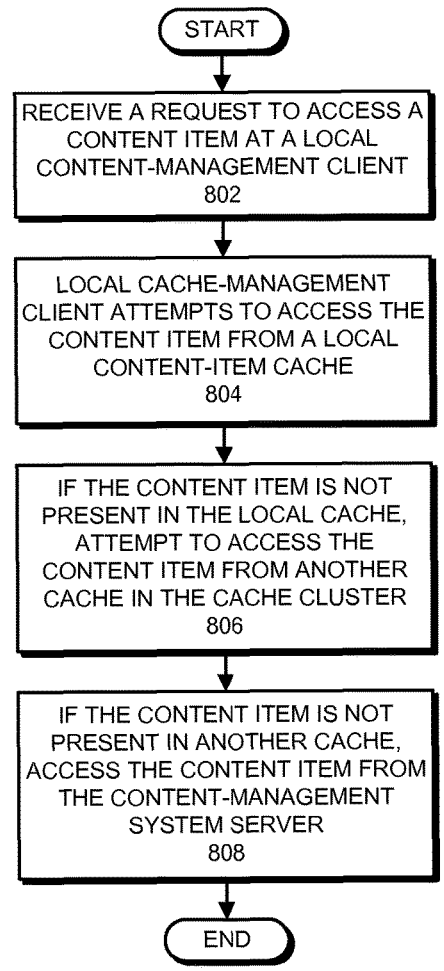
FIG. 8 presents a flow chart illustrating the process of accessing a content item from an online content-management system that includes a cache cluster in accordance with the disclosed embodiments.

The unified cache can effectively provide two levels of caching where the cache cluster acts as a secondary cache for content items. For example, FIG. 8 presents a flow chart illustrating the process of accessing a content item from an online content-management system 120 that includes a cache cluster in accordance with the disclosed embodiments. First, the system receives a request to access a content item at a local content-management client 602 (step 802). Content-management client 602 first attempts to access the content item from local content-item cache 604 (step 804). If the content item is not present in local content-item cache 604, the system attempts to access the content item from another cache in the cache cluster (step 806). Finally, if the content item is not present in another cache, the system accesses the content item from the content-management system server (e.g., online content-management system 120) (step 808).

For example, suppose that locality 600 is a train and computing devices 601, 611 and 621 belong to different passengers in the train. Also suppose a passenger attempts to access a page from a news website and the page is made available through online content-management system 120. In this case, the content item can be retrieved from a content-item cache in another user's computing device if the other user has recently viewed the same page instead of having to access the online content-management system 120. This is advantageous if the network intermittent connection 630 is temporarily cut off.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for managing a master cache cluster that stores content items that are synchronized between an online content-management system and a computing device that hosts a master local cache controller, the method comprising:
   obtaining usage data associated with the computing device, the computing device hosting a local cache;
   applying one or more rules to the usage data to identify one or more relevant content items to be accessed by the computing device;
   obtaining proximity data to identify at least one other computing device hosting a local cache controller configured to communicate with the computing device that hosts the master local cache controller, wherein the computing device and the at least one other computing device are mobile devices; and
   performing a cache-management operation at the master local cache controller to facilitate accessing the one or more relevant content items from the online content-management system through the master cache cluster, wherein the master cache cluster is connected to the online content management system via a first connection that is intermittent and the master cache cluster is connected via a second connection that is a wired or wireless network, wherein the first connection and second connection are different.

2. The method of claim 1, wherein performing the cache-management operation comprises:
   prefetching a relevant content item or a portion of a relevant content item into at least one local cache;
   reserving space for the one or more relevant content items in the at least one local cache;
   preventing the relevant content item or the portion of a relevant content item from being removed from the at least one local cache;
   updating a cache-replacement policy for the local cache to keep the relevant content item in the at least one local cache; and
   allocating space in the at least one local cache for one or more applications executed by the computing device.

3. The method of claim 1, wherein obtaining the usage data further comprises:
   determining that at least one computing device is moving to a geographic location that is associated with the one or more relevant content items that are frequently accessed at the geographic location; and
   synchronizing a set of relevant content items that are frequently accessed at the geographic location from the online content-management system to the local cache.

4. The method of claim 1, wherein identifying the one or more relevant content items comprises:
   determining a present location of the at least one computing device;
   identifying one or more content items that were accessed when the at least one computing device was previously in proximity to the present location;
   identifying a type of content item that was accessed when the at least one computing device was previously in proximity to the present location;
   identifying content items associated with one or more applications that were executed when the at least one computing device was previously in proximity to the present location; and
   synchronizing the identified content items to the local cache.

5. The method of claim 1, wherein the one or more relevant content items can include one or more of:
   an image;
   an audio clip;
   a video clip;
   a document; and
   a data file.

6. The method of claim 1, wherein obtaining the usage data further comprises:
   determining that a set of navigation-related content items in the local cache have not been accessed in a recent time interval;
   determining that the computing device is in motion; and
   not evicting the set of navigation-related content items from the local cache while the computing device is in motion.

7. The method of claim 1, wherein obtaining the usage data further comprises:
   determining from an accelerometer in the computing device that the computing device is associated with a user who is running; and
   synchronizing a set of content items to the local cache that are associated with running.

8. The method of claim 1, wherein obtaining the usage data further comprises:
   determining from a microphone in the computing device that the computing device is in a noisy environment; and
   evicting from the local cache a set of audio content items that are associated with applications that historically have not been executed in noisy environments.

9. The method of claim 1, wherein the method further comprises:
   detecting a set of additional computing devices that are proximate to the computing device and accessible via a local area network;
   detecting an intermittent connection to the online content-management system; and
   working collaboratively with the set of additional computing devices to share content item cache resources.

10. A non-transitory computer-readable storage medium comprising instructions that when executed by a computer cause the computer to perform a method for managing a master cache that stores content items that are synchronized between an online content-management system and a computing device that hosts a master local cache controller, the instructions causing the computer to:
    obtain usage data associated with the computing device, the computing device hosting a local cache;

apply one or more rules to the usage data to identify one or more relevant content items to be accessed by the computing device;
obtain proximity data to identify at least one other computing device hosting a local cache controller configured to communicate with the computing device that hosts the master local cache controller, wherein the computing device and the at least one other computing device are mobile devices; and
perform a cache-management operation at the master local cache controller to facilitate accessing the one or more relevant content items from the online content-management system through master local cache cluster, wherein the master local cache cluster is connected to the online content-management system via a first connection that is intermittent and the master cache cluster is connected via a second connection that is a wired or wireless network, wherein the first connection and second connection are different.

11. The non-transitory computer-readable storage medium of claim 10, wherein performing the cache-management operation comprises:
prefetch a relevant content item or a portion of a relevant content item into the local cache;
reserve space for the one or more relevant content items in the local cache;
prevent a relevant content item or a portion of a relevant content item from being removed from the local cache;
update a cache-replacement policy for the local cache to keep a relevant content item in the local cache; and
allocate space in the local cache for one or more applications executed by the computing device.

12. The non-transitory computer-readable storage medium of claim 10, wherein obtaining the usage data further comprises instructions to cause the computer to:
determine that the computing device is moving to a geographic location that is associated with the one or more relevant content items that are frequently accessed at the geographic location; and
synchronize a set of relevant content items that are frequently accessed at the geographic location from the online content-management system to the local cache.

13. The non-transitory computer-readable storage medium of claim 10, wherein identifying the one or more relevant content items comprises instructions to cause the computer to:
determine a present location of the computing device;
identify one or more content items that were accessed when the computing device was previously in proximity to the present location;
identify a type of content item that was accessed when the computing device was previously in proximity to the present location;
identify content items associated with one or more applications that were executed when the computing device was previously in proximity to the present location; and
synchronize the identified content items to the local cache.

14. A system that manages a master cache cluster that stores content items for an online content-management system, comprising:
a computing device comprising at least one processor and a memory;
a content-management client for the online content-management system; and
a master local cache controller for the master cache cluster configured to:
obtain usage data associated with the computing device, the computing device hosting a local cache;
apply one or more rules to the usage data to identify one or more relevant content items to be accessed by the computing device,
obtain proximity data to identify at least one other computing device hosting a local cache controller configured to communicate with the computing device that hosts the master local cache controller, wherein the computing device and the at least one other computing device are mobile devices; and
perform a cache-management operation at the local cache to facilitate accessing the one or more relevant content items from the online content-management system through the master cache cluster, wherein the master local cache cluster is connected to the online content-management system via a first connection that is intermittent and the master cache cluster is connected via a second connection that is a wired or wireless network, wherein the first connection and second connection are different.

15. The system of claim 14, wherein while performing the cache-management operation, the cache controller is configured to:
prefetch a relevant content item or a portion of a relevant content item into the local cache;
reserve space for the one or more relevant content items in the local cache;
prevent the relevant content item or the portion of a relevant content item from being removed from the local cache;
update a cache-replacement policy for the local cache to keep the relevant content item in the local cache; and
allocate space in the local cache for one or more applications executed by the computing device.

16. The system of claim 14, wherein while performing the cache-management operation, the master local cache controller is configured to obtain and consider a user preference for caching a type of content item.

17. The non-transitory computer-readable storage medium of claim 14, wherein identifying the one or more relevant content items comprises instructions to cause the computer to:
determine a present location of the computing device;
identify one or more content items that were accessed when the computing device was previously in proximity to the present location;
identify a type of content item that was accessed when the computing device was previously in proximity to the present location;
identify content items associated with one or more applications that were executed when the computing device was previously in proximity to the present location; and
synchronize the identified content items to the local cache.

18. The system of claim 14, wherein while identifying the one or more relevant content items the master local cache controller is configured to:
determine a present location of the computing device;
identify one or more content items that were accessed when the computing device was previously in proximity to the present location;
identify a type of content item that was accessed when the computing device was previously in proximity to the present location;

identify content items associated with one or more applications that were executed when the computing device was previously in proximity to the present location; and
synchronize the identified content items to the local cache.

* * * * *